US009044996B2

(12) United States Patent
Ikeda et al.

(10) Patent No.: US 9,044,996 B2
(45) Date of Patent: Jun. 2, 2015

(54) ACTIVATING AGENT FOR HYDRAULIC TRANSFER FILM, HYDRAYLIC TRANSFER METHOD, AND HYDRAULIC TRANSFER PRODUCT

(75) Inventors: Wataru Ikeda, Tokyo (JP); Youichiro Yoshii, Tokyo (JP)

(73) Assignee: TAICA CORPORATION, Tokyo (JP)

( * ) Notice: Subject to any disclaimer, the term of this patent is extended or adjusted under 35 U.S.C. 154(b) by 11 days.

(21) Appl. No.: 13/503,311

(22) PCT Filed: Oct. 21, 2010

(86) PCT No.: PCT/JP2010/068542
§ 371 (c)(1), (2), (4) Date: Apr. 20, 2012

(87) PCT Pub. No.: WO2011/049151
PCT Pub. Date: Apr. 28, 2011

(65) Prior Publication Data

US 2012/0207987 A1 Aug. 16, 2012

(30) Foreign Application Priority Data

Oct. 21, 2009 (JP) ................................ 2009-242247

(51) Int. Cl.
*B44C 1/175* (2006.01)
*B32B 3/10* (2006.01)
*C09J 133/00* (2006.01)

(52) U.S. Cl.
CPC ......... *B44C 1/175* (2013.01); *Y10T 428/24802* (2015.01)

(58) Field of Classification Search
CPC ........... B32B 3/10; C09J 133/00; B44C 1/165
USPC ......................... 524/556; 522/182; 428/195.1
See application file for complete search history.

(56) References Cited

U.S. PATENT DOCUMENTS

2006/0073342 A1* 4/2006 Ariga et al. .................. 428/413
2007/0051458 A1* 3/2007 Ikeda et al. .................. 156/235
2007/0154685 A1* 7/2007 Ikeda et al. ............... 428/195.1
2008/0063981 A1* 3/2008 Ohnishi ....................... 430/302
2008/0199664 A1* 8/2008 Otaki et al. ............... 428/195.1

FOREIGN PATENT DOCUMENTS

JP 10 017788 A 1/1998
JP 2004 034393 A 2/2004

(Continued)

*Primary Examiner* — Michael M Bernshteyn
(74) *Attorney, Agent, or Firm* — Pearne & Gordon LLP

(57) ABSTRACT

A coating agent of an ultraviolet ray hardening resin composite type for a water pressure transfer film to restore an adhesion, the ultraviolet ray hardening resin composite having a viscosity of 10-500 CPS (25° C.) and an ink solubility of SP value of 7 or more and including a photo-polymerization oligomer of 25 to 56 weight percent, a photo-polymerization monomer of bi-functional monomer of 33 to 65 weight percent and a photo-polymerization initiator of 5 to 10 weight percent for accomplishing both of membrane strength and adhesion, the photo-polymerization oligomer including a compound of multi-functional oligomer having a blend rate of 12 to 40 weight percent and bi-functional oligomer having a blend rate of 7 to 16 weight percent, the coating agent including a non-reactive resin of 2 to 10 weight percent added to the ultraviolet ray hardening resin composite, and a method of a water pressure transfer method for activating the transfer film by using the coating agent.

8 Claims, 3 Drawing Sheets

(56) References Cited

FOREIGN PATENT DOCUMENTS

| | | | |
|---|---|---|---|
| JP | 2005 014604 | A | 1/2005 |
| JP | 2008 201918 | A | 9/2008 |
| JP | 2009 190328 | A | 8/2009 |
| WO | 2004/108434 | A1 | 12/2004 |
| WO | 2005/077676 | A1 | 8/2005 |
| WO | 2007/023525 | A1 | 3/2007 |
| WO | 2007/023577 | A1 | 3/2007 |

* cited by examiner

ACTIVATING AGENT FOR HYDRAULIC TRANSFER FILM, HYDRAYLIC TRANSFER METHOD, AND HYDRAULIC TRANSFER PRODUCT

TECHNICAL FIELD

This invention relates to an activating agent for a water pressure transfer film and more particularly to an improvement on an activating agent for a water pressure transfer film to be coated on a print pattern before water pressure transfer in order to reproduce (recover) an adhesion of the dried print pattern on a water pressure transfer film which is to be transferred under water pressure on a surface of an article to be decorated.

BACKGROUND OF THE INVENTION

There has been used a water pressure transfer method in order to decorate a surface of an article having a complicated three-dimensional surface in which a water pressure transfer film having a print pattern of non-water solubility on a water-soluble film is floated on a water surface in a transfer tub, after this water-soluble film of the water pressure transfer film is made wet with water, an article (an object to be pattern-transferred) is forced underwater while contacting the print pattern of the water pressure transfer film and the print pattern of the water pressure transfer film is transferred to the surface of the article using water pressure generated relative to the surface of the article when the article is forced underwater to form a decorative layer is formed on the surface of the article.

In general, since the water pressure transfer film has the print pattern printed and dried on the water-soluble film and is stored while it is wound in the form of roll, the ink of the print pattern is in the dry state where the ink loses its adhesion. Thus, it is required to apply an activating agent or solvents such as thinner to make it the wet state (recover the state of having an adhesion), which is like the state immediately after the print pattern is printed. This treatment normally called an activation process.

The decorative layer thus formed on the surface of the article by the water pressure transfer is required to have the physical and chemical surface protection function such as abrasion resistance, solvent resistance, chemical resistance and weather resistance and also to be adhered onto the surface of the article with high strength so as not to be removed therefrom.

The applicant has already proposed the invention for transferring the decoration layer under water pressure while imparting abrasion resistance, solvent resistance, etc. to the decoration layer itself, without having a topcoat layer on the decoration layer (refer to Patent Documents 1 through 3). According to the methods of these inventions, an ultraviolet ray hardening resin composite including a non-solvent type activation ingredient such as photo-polymerization monomer for reproducing the adhesion of the dried print pattern of the water pressure transfer film is applied on the print pattern whereby the adhesion of the print pattern is reproduced by the activation ingredient of the ultraviolet ray hardening resin composite and the print pattern is transferred onto the film-transferred object under water pressure in the state where the ultraviolet ray hardening resin composite is permeated into the whole print pattern. Therefore, when the ultraviolet ray hardening resin composite within the print pattern is hardened by irradiation of ultraviolet ray, the decoration layer has the state as if the ultraviolet ray hardening characteristic is just imparted to the decoration layer itself. Thus, the decoration layer has chemical and mechanical surface protection functions such as solvent resistance and abrasion resistance imparted to the decoration layer itself.

In order to apply the ultraviolet ray hardening resin composite onto the water pressure transfer film to thereby reproduce the adhesion of the dried print patter and permeate the ultraviolet ray hardening resin composite into the print pattern whereby the print pattern and the ultraviolet ray hardening resin composite are integrally intermingled with each other so as to be fully united with each other for imparting the ultraviolet ray hardening characteristic to the print pattern, the ultraviolet ray hardening resin composite is ideally required to have a comparatively low viscosity allowing the ultraviolet ray hardening resin composite to be permeated into the whole print pattern once dried and hardened in a uniform manner and an ink solubility allowing the ink to be dissolved to recover the adhesion of the ink and the ultraviolet ray hardening resin composite is required to be applied to the print pattern in the required amount of application on the water pressure transfer.

If the ultraviolet ray hardening resin composite has too high viscosity, then it will fail to permeate the whole print pattern in an adequate amount and if the ink solubility of the ultraviolet ray hardening resin composite is too low, then the adhesion of the print pattern in the state of dryness and solidification will be never reproduced. If the amount of application of the ultraviolet ray hardening resin composite is too low, then the ultraviolet ray hardening resin composite will never reach the surface of the print pattern (the outer surface of the print pattern after it is transferred).

If the viscosity of the ultraviolet ray hardening resin composite is too low or if there are too much amount of application thereof, the print pattern will be broken down and there will be generated a phenomenon where the pattern fades.

Thus, in order that the adhesion of the dry print pattern is reproduced or the ultraviolet ray hardening resin composite is permeated into and fully united with the print pattern, the ultraviolet ray hardening resin composite is required to have the predetermined degree of the viscosity, the ink solubility and the amount of applications. What is meant by the state where the ultraviolet ray hardening resin is integrally united with the print pattern is not the state where it is partially mixed with the print pattern, but the state where it is wholly and preferably just uniformly with the print pattern. If the ultraviolet ray hardening resin composite might be combined with the print pattern just only on the resin composite application side thereof, but never reach the outer surface of the print pattern after it is transferred, then the surface of the decoration layer, which is the outermost surface of the decoration layer has no surface protection function such as solvent resistance and so on imparted thereto.

The commercially available conventional ultraviolet ray hardening resin composites include at least a photo-polymerization pre-polymer, a photo-polymerization monomer and a photo-polymerization initiator, but these commercially available ultraviolet ray hardening resin composites were not such products as were manufactured for intentional use in which the resin composites permeate the whole ink once dried and hardened so as to be integrally combined with the print pattern and is hardened together with the ink after the ultraviolet ray is radiated as if the ultraviolet ray hardenability is imparted to the ink. Thus, these resin composites can be applied for water pressure transfer of low or middle level where the products have the pattern looking like wooden grain, but never fully meet the water pressure transfer of high or ultrahigh level requiring precise design such as true tree feeling in the decoration of interior parts of cars. These ultraviolet ray hardening resin composites for wide use cannot be satisfactorily applied to a water pressure transfer of high or super-high grade in which a minute design quality such as true tree feeling required for decoration in a car interior article. In addition thereto, these ultraviolet ray hardening resin composites cannot be satisfactorily applied to various transfer films having huge accumulation of the past with respect to the elements of the ink such as the kind of ink or the shade to be used for the print pattern and there remain the problems in compatibility and conformity with various equipment used in the conventional water pressure transfer processing lines.

The applicant have proposed the activating agent for the water pressure transfer film applicable also to the water pressure transfer of high grade or super high grade which cannot be accomplished by the conventional general-purpose ultraviolet ray hardening resin composite (see Patent Document 4).

The activating agent according to Patent Document 4 includes a photo-polymerization pre-polymer, a photo-polymerization monomer and a photo-polymerization initiator without any inclusion of an organic solvent, the photo-polymerization pre-polymer being of 9 to 40 mass %, bi-functional photo-polymerization monomer being of 50 to 90 mass %, a photo-polymerization initiator being of 0.5 to 5 mass % and the remainder being of 0.5 to 5 mass % and has a viscosity of 10-100 CPS (25° C.) or (25 degree Celsius) and an ink solubility of 10 or more at SP value.

According to the activating agent by Patent Documents 4 proposed by the applicant, the photo-polymerization monomer of the ultraviolet ray hardening resin composite has solvent power to the ink of the print pattern as well as solvent power to the photo-polymerization pre-polymer and as a result, the activating agent has the good hardenability, the good adhesion to ABS resin, PC material, etc., a substrate on which the pattern is transferred by the water pressure transfer, the smoothness because of little contractility when it is hardened and the transparency maintained. Thus, the adhesion to the dried and solidified print pattern of the water pressure transfer film can be positively reproduced by the proper viscosity and ink solubility of the ultraviolet ray hardening resin composite and in addition thereto, since the ultraviolet ray hardening resin composite can permeate and enter into the total thickness of the print pattern from the surface of the print pattern on the side of the application thereof to the surface thereof on the opposite side so that the resin composite and the print pattern are positively and harmoniously integrated with each other through the whole of the print pattern (the whole area and thickness thereof) after the ultraviolet ray hardening, the decoration layer obtained by transferring the print pattern is hardened by ultraviolet ray over the whole decoration layer including the outside surface thereof and therefore the surface protection function by ultraviolet ray hardening is positively imparted to the decoration layer itself. Thus, the activating agent can be satisfactorily applied to the water pressure transfer of high grade and super-high grade in which a minute design quality such as true tree feeling is required and also to the abundance of kind of the print pattern of the transfer film having huge accumulation of the past and there are compatibility and conformity with the equipment used in the conventional water pressure transfer processing lines.

Since the activating agent contains the ultraviolet ray hardening resin composite having the specific viscosity of 10-100 CPS (25° C.) and the specific ink solubility of 10 or more at SP value, the solubility of the ultraviolet ray hardening resin composite can be closer to the solubility of the ink ingredient of the print pattern. Smooth coating of the activating agent to the ink ingredient of the print pattern and the permeation of the ultraviolet ray hardening resin composite into the ink ingredient can be secured by specifying the viscosity of the ultraviolet ray hardening resin composite as aforementioned.

Furthermore, the activating agent can reduce the viscosity of the photo-polymerization pre-polymer having a tendency of high viscosity and also makes the solubility of the ultraviolet ray hardening resin composite closer to the solubility of the ink ingredient of the print pattern by using the photo-polymerization monomer having the specific viscosity of 3 to 30 CPS (25° C.) and the specific ink solubility of 9 or more at SP value and therefore the property (smooth applicability) for being able to smoothly applying the activating agent onto the ink ingredient of the print pattern and the property (permeability) for permeating the ultraviolet ray hardening resin into the ink ingredient well can be secured. The ultraviolet ray hardening resin composite have the good adhesion thereof to the substrate of ABS resin, PC material, etc. the smooth applicability and the transparency fully secured when it is hardened, which can obtain the activating agent for the water pressure transfer film having all of those properties provided.

However, in general the physical strength and the membranous adhesion (including the temporal adhesion (light resistance adhesion) under ultraviolet ray exposure environment) of the membrane adhered to an article are inconsistent with each other and therefore, if one of them tries to be improved, the other will be deteriorated whereby both of them cannot be satisfactorily accomplished.

The activating agent according to Patent Documents 4 can improve the physical properties such as the strength and the chemical resistance of the decoration layer formed on the surface of the article by the water pressure transfer, can improve the original adhesion on the surface of the article to obtain the good decoration layer and can improve the light resistance to some extent to maintain the adhesion property, but as already stated, if the adhesion property including light resistance adhesion property tries to be further improved, a tendency for the strength and the chemical resistance of the decoration layer will be lowered and therefore it is difficult to satisfy both of the physical properties of the decoration layer and the adhesion property thereof.

In order to improve the characteristic of the ultraviolet ray hardening resin composite, there have been added a non-reactive resin such as acrylics polymer to the ultraviolet ray hardening resin composite (Patent Document 5 and 6).

The technique disclosed in Patent Document 5 is the one in which the non-reactive ingredient such as poly-methacrylate is added to the active energy line hardening resin composite which is the transfer layer of the transfer film to control the fluidity of the transfer layer and the technique disclosed in Patent Document 6 is the one in which the non-reactive ingredient such as acrylics polymer is added to the active energy line hardening resin composite which is the main ingredient of the coating composite for metal to reduce the volume contraction rate of the composite when it is hardened. However, in these techniques, the non-reactive ingredient only improves the fluidity and the volume contraction rate of the active energy line hardening resin composite and the two characteristics of membrane physical properties and the adhesion of the membrane, which are inconsistent with each other cannot be simultaneously satisfied.

PRIOR ART DOCUMENTS

Patent Documents

Patent Document 1 WO2004/108434
Patent Document 2 JP2005-14604A1

Patent Document 3 WO2005/77676
Patent Document 4 WO2007/23577
Patent Document 5 JP2004-034393A1
Patent Document 6 JP (Heisei) 10-017788

SUMMARY OF THE INVENTION

Problems to be Solved by the Invention

A first problem to be solved by this invention is to provide a coating agent for a water pressure transfer film for recovering an adhesiveness of a print pattern of the water pressure transfer film before the water pressure transfer adapted to maintain for longer time an adhesion property of a decoration layer obtained by the water pressure transfer as well as the physical properties such as the strength and the chemical resistance thereof.

A second problem to be solved by the invention is to provide a water pressure transfer method adapted to maintain for longer time an adhesion property of a decoration layer obtained by transferring a print pattern of a water pressure transfer film under water pressure after recovering an adhesiveness of the print pattern by a coating agent of ultraviolet ray hardening resin composite as well as the physical properties such as the strength and the chemical resistance thereof.

A third problem to be solved by the invention is to provide a water pressure transfer article adapted to maintain for longer time an adhesion property of a decoration layer obtained by transferring a print pattern of a water pressure transfer film under water pressure after recovering an adhesiveness of the print pattern by a coating agent of ultraviolet ray hardening resin composite as well as the physical properties such as the strength and the chemical resistance thereof.

Means to Solve the Problems

First means to solve a problem of the invention is to provide an coating agent for a water pressure transfer film, said coating agent including an ultraviolet ray hardening resin composite to be applied on a dried print pattern of said water pressure transfer film having said print pattern on a water-soluble film before said print pattern is transferred onto a surface of a article, said ultraviolet ray hardening resin composite including a photo-polymerization pre-polymer, a photo-polymerization monomer and a photo-polymerization initiator, said coating agent serving to reproduce an adhesiveness of said print pattern by non-solvent activating ingredient of said ultraviolet ray hardening resin composite and permeating said ultraviolet ray hardening resin composite into the whole of said print pattern to thereby be intermingled with said whole print pattern, characterized by said photo-polymerization oligomer including a multi-functional oligomer and a bi-functional oligomer, said photo-polymerization monomer including a multi-functional monomer and a bi-functional monomer, said coating agent including a non-reactive resin added in addition to said ultraviolet ray hardening resin composite, said photo-polymerization oligomer being blended at 25 to 56 weight %, said photo-polymerization monomer being blended at 33 to 65 weight %, said photo-polymerization initiator being blended at 5 to 10 weight % and said nonreactive resin being blended at 2 to 10 weight %.

In the first means to be solved by the problem of the invention, the photo-polymerization oligomer is preferably a blend of the multi-functional oligomer having a blend rate of 12 to 40 weight % and the bi-functional oligomer having a blend rate of 7 to 16 weight %.

In the first means to be solved by the problem of the invention, a part of bi-functional monomer of said photo-polymerization monomer may be replaced by the multi-functional monomer blended at 10 or less weight % and the multi-functional monomer may be preferably a tetra-functional monomer.

Second means to solve a problem of the invention is to provide a water pressure transfer method comprising the steps of applying a coating agent comprising an ultraviolet ray hardening resin composite to be applied on a dried print pattern of a water pressure transfer film having said print pattern on a water-soluble film when said print pattern is transferred onto a surface of an article to thereby recover an adhesion of said print pattern of said transfer film by non-solvent activating ingredient of said ultraviolet ray hardening resin composite including a photo-polymerization pre-polymer, a photo-polymerization monomer and a photo-polymerization initiator, thereafter transferring under water pressure said print pattern onto said surface of said article while said ultraviolet ray hardening resin composite permeates the whole of said print pattern to thereby be intermingled with said whole print pattern and hardening said ultraviolet ray hardening resin composite by irradiation of ultraviolet ray, characterized by said photo-polymerization oligomer including a multi-functional oligomer and a bi-functional oligomer, said photo-polymerization monomer including a multi-functional monomer and a bi-functional monomer, said coating agent including non-reactive resin added in addition to said ultraviolet ray hardening resin composite, said photo-polymerization oligomer being blended at 25 to 56 weight %, said photo-polymerization monomer being blended at 33 to 65 weight %, said photo-polymerization initiator being blended at 5 to 10 weight % and said nonreactive resin being blended at 2 to 10 weight %.

In the first and second means to be solved by the invention, said non-reactive resin may be preferably acrylics polymer and the blend (addition) rate thereof may be 2 to 10 weight %.

In the first and second means to be solved by the invention, there may be added to said coating agent an ultraviolet ray absorbent (referred to as UV-A hereinafter), a light resistance imparting agent such as a hindered amine light stabilizer (referred to as HALS hereinafter), a leveling agent and/or a matting agent.

Third means to be solved by the invention is to provide a water pressure transfer article having a decoration layer formed by the second means to be solved by the invention.

Effect of the Invention

In the invention, the multi-functional oligomer of the photo-polymerization oligomer of the ultraviolet ray hardening resin composite imparts the mechanical and chemical properties of the decoration layer formed by transferring the print pattern under water pressure and the bi-functional oligomer thereof imparts the excellent adhesion (including the light resistance adhesion, ditto later) to the decoration layer. On the other hand, the multi-functional monomer of the photo-polymerization monomer imparts the strength to the decoration layer and the bi-functional monomer thereof has the solubility for recovering the adhesion of the print pattern. The non-reactive resin such as acrylics polymer has the function to impart both of the strength and the chemical resistance of the decoration layer and the adhesion thereof, which are otherwise inconsistent with each other and therefore the strength and the chemical resistance of the decoration layer and the light-resistance adhesion thereof can be simultaneously improved by the application of the ultraviolet ray hardening resin composite to the print pattern.

UV-A and HALS which may be added to the coating agent improve the light resistance while maintaining the adhesion in the blend rate within the specific range, the leveling agent adjusts the fluidity of the coating agent without deteriorating the adhesion of the decoration layer and the matting agent imparts the matting effect to the decoration layer. The light resistance improvement by UV-A is based on the ultraviolet ray absorption function and the light resistance improvement by HALS is based on the free radical collection function.

BEST MODE OF EXAMPLE OF INVENTION

Figure 1:
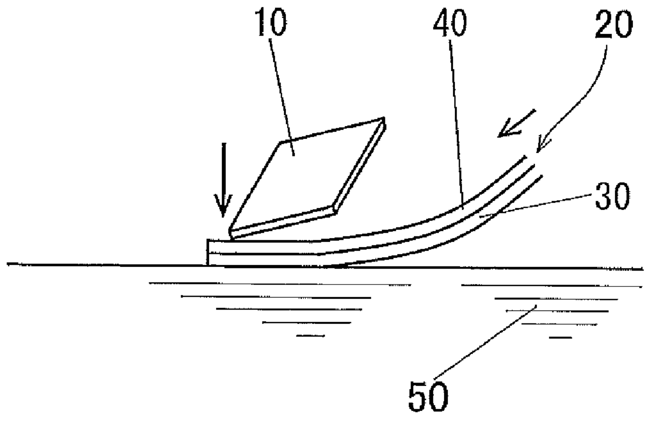
FIG. 1 is a schematic diagram showing the outline of the water pressure transfer carried out with a coating agent of the invention used.

Referring to a mode of embodiment of the invention in details with reference to the drawings, FIG. 1 schematically illustrates a water pressure transfer method to which this invention is applied. This water pressure transfer method is a method in which a water pressure transfer film 20 comprising a water soluble film (a carrier film) 30 having a print pattern 40 applied thereon is supplied to water 50 within a transfer tab and floated on the water with the print pattern 40 directed upside and an article 10, which should have the print pattern transferred thereon under water pressure is forced underwater through the transfer film 20 to thereby perform the water pressure transfer.

The water soluble film 30 is formed of water soluble material having a main ingredient of polyvinyl alcohol, for example, which gets wet and is softened by absorbing the water. This water soluble film 30 is softened when it contacts the water 50 within the transfer tub to be adhered around the article to be decorated and be able to carry out the water pressure transfer. In general water pressure transfer, the print pattern 40 may be applied on the water soluble film 30 by gravure printing and so on and the transfer film 20 may be stored in the state of dryness and solidification where the adhesion is completely lost in order to be stored in the state of being roll wound. The print pattern 40 includes a plain (no-pattern) print layer other than a pattern in a strict meaning.

Figure 2:
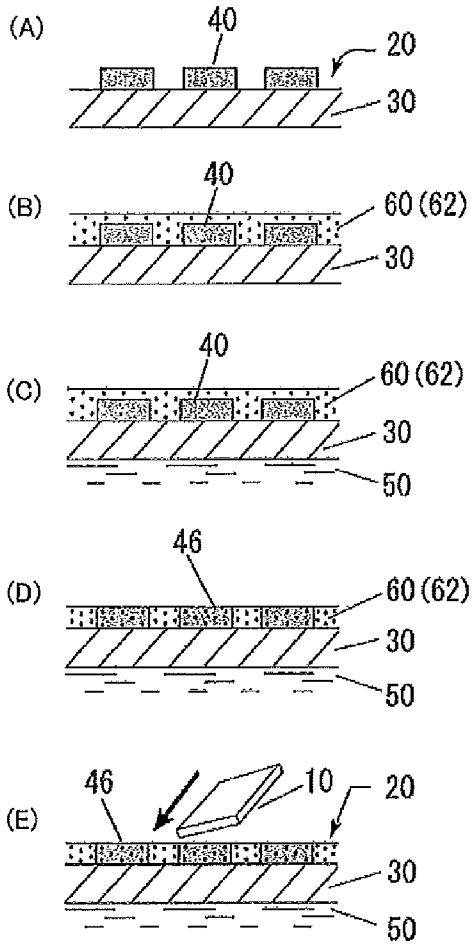
FIG. 2 schematically illustrates each process of the method for performing a water pressure transfer applied to an article using the coating agent of the invention.

As shown in FIG. 2, the water pressure transfer method to which the invention is applied is a method in which a coating agent 60 containing a ultraviolet ray hardening resin composite 62 is coated onto the print pattern 40 of the transfer film 20 (see FIG. 2B) before the water pressure transfer is carried out on an article (see FIG. 2A) to thereby reproduce the adhesion of the print pattern 40 by the non-solvent activating ingredient of the ultraviolet ray hardening resin composite and also to permeate and absorb the ultraviolet ray hardening resin composite 62 into the whole print pattern 40 (of total area and total thickness) whereby the ultraviolet ray hardening resin composite 62 is intermingled with the print pattern 40 (see FIG. 2C). This mixes the ink ingredient of the print pattern and the ultraviolet ray hardening resin composite 62 coated to the print pattern 40 and permeated into the print pattern 40 with each other whereby a ultraviolet ray hardening resin composite mixed print pattern 46 is formed (see FIG. 2D).

In this manner, after transferring onto an article 10 under water pressure the transfer film 20 which has the ultraviolet ray hardening resin composite mixed print pattern 46 formed by reproducing the adhesion with the ultraviolet ray hardening resin composite and intermingling the ultraviolet ray hardening resin composite 62 with the whole print pattern 40 (see FIG. 2E), an ultraviolet ray 70 is irradiated onto the article 10 (see FIG. 2F) whereby the ultraviolet ray hardening resin composite in the ultraviolet ray hardening resin composite mixed print pattern 46 is hardened in the state where it is fully integrally united with the print pattern and therefore, this is just equivalent to the state where the ultraviolet ray hardening is given to the print pattern 40 itself. Therefore, the decoration layer 44 formed by transfer of the ultraviolet ray hardening resin mixed print pattern 46 has the ultraviolet ray hardening resin composite distributed and hardened by the ultraviolet ray whereby the decoration layer itself has the surface protection function (see FIG. 3).

The irradiation of the ultraviolet ray 70 of FIG. 2F is preferably carried out while the water-soluble film 30 of the water pressure transfer film 20 is wound around the article 10 having the ultraviolet ray hardening resin composite mixed print pattern 46 transferred thereto. Thus, although not shown, the ultraviolet ray irradiation step is preferably carried out while the article is underwater or before the washing operation for removing the water soluble film after the article is taken out from the water. The ultraviolet ray 70 may be irradiated by using the publicly known ultraviolet ray hardening device including a light source such as a high pressure mercury lamp, a metal halide lamp and so on and an irradiation machine (lamp house).

Figure 3:
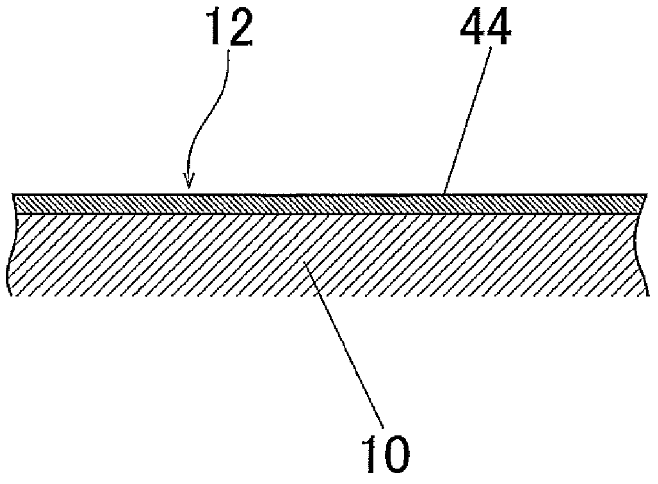
FIG. 3 is an enlarged sectional view of the article having the decoration layer obtained by the method of FIG. 2.

Thereafter, as shown in FIG. 2G, the article 10 is water-washed by a shower 72 whereby the water-soluble film (swelling dissolution film layer) covering the upper surface of the decoration layer 44 formed on the article 10 is removed, the surface thereof is dried by a hot wind 74 and the decorated article 12 having the decoration layer 44 transferred under water pressure on the surface of the article 10 is completed (see FIG. 3).

The ultraviolet ray hardening resin composite 62 which is the main ingredients of the coating agent 60 of the invention is a resin which can be hardened for a comparatively short time by a chemical action of the ultraviolet ray and may be in the form of ultraviolet ray hardening type paint, ultraviolet ray hardening type ink, ultraviolet ray hardening type adhesive and so on according to its use. Basically, the coating agent essentially includes (1) a photo-polymerization oligomer (pre-polymer), (2) a photo-polymerization monomer and (3) a photo-polymerization initiator in the liquid state before it is hardened by the ultraviolet ray as similar to the conventional coating agent, but is characterized by further including predetermined ingredients described later in details and has a predetermined non-reactive ingredient added to the ultraviolet ray hardening resin composite. Of course, the coating agent is required to have the predetermined viscosity and ink solubility.

The coating agent for water pressure transfer film of the invention is characterized by including an ultraviolet ray hardening resin composite and a non-reactive resin, the ultraviolet ray hardening resin composite including a photo-polymerization oligomer, a photo-polymerization monomer and a photo-polymerization initiator, the photo-polymerization oligomer including a multi-functional oligomer and a bi-functional oligomer and the photo-polymerization monomer being a bi-functional monomer wherein the photo-polymerization oligomer, the photo-polymerization monomer and the photo-polymerization initiator are blended at the blend rate of 25 to 56 weight % of the photo-polymerization oligomer, at 33 to 65 weight % of the photo-polymerization monomer and at 5 to 10 weight % of the photo-polymerization initiator relative to the total amount of the photo-polymerization oligomer, the photo-polymerization monomer, the photo-polymerization initiator and the non-reactive resin and the non-reactive resin is added at the rate of 2 to 10 weight %.

A part of the bi-functional monomer of the photo-polymerization monomer may be substituted by the multi-functional monomer within the range of 10 or less weight % in order to improve the membrane strength and the multi-functional monomer may be preferably tetra-functional monomer.

The preferable ultraviolet ray hardening resin composite includes the following ingredients (1) through (3) and also includes a non-reactive resin (4) and these ingredients (1) through (4) (the total of 100 weight %) are the essential ingredients and also the non-reactive ingredients indicated below the item (5) may be optionally contained.

| | |
|---|---|
| (1) photo-polymerization oligomer (25 to 56 weight % in total) | |
| multi-functional oligomer | 12 to 40 weight % |
| bi-functional oligomer | 7 to 16 weight % |
| (2) photo-polymerization monomer (33 to 65 weight % in total) | |
| bi-functional monomer | 33 to 65 weight % |
| tetra-functional monomer | 0 to 10 weight % |
| (3) photo-polymerization initiator | 5 to 10 weight % |
| (4) Non-reactive resin | 2 to 10 weight % |

The amount of addition of (5) through (7) is a blend rate relative to the total of (1) through (4).

| | |
|---|---|
| (5) light resistance imparting agent | |
| UV-A | 0.5 to 1.5 weight % |
| HALS | 1.5 to 3.5 weight % |
| (6) leveling agent | 0.01 to 0.10 weight % |
| (7) matting agent (resin beads) | 5 to 20 weight % |

Explanation of Photo-Polymerization Oligomer

In the invention, the photo-polymerization oligomer used for the ultraviolet ray hardening resin composite is a polymer which can be further hardened by photochemistry action and it is called photo-polymerization unsaturated polymer, base resin or photo-polymerization pre-polymer. It may be either one or an arbitrary combination of acrylic oligomer, polyester oligomer, epoxy acrylate oligomer, urethane acrylate oligomer and so on. The photo-polymerization oligomer used for the invention includes a multi-functional oligomer and a bi-functional oligomer, the multi-functional oligomer imparts to the decoration layer obtained by the water pressure transfer of the print pattern the mechanical properties (mechanical strength etc. of the membrane) of the decoration layer, the chemical characteristics (chemical resistance etc.) and also various characteristics such as light resistance resulting from the molecular structure of the hardened material of the multi-functional oligomer in the decoration layer to the decoration layer and the bi-functional oligomer provides the adhesion of the decoration layer. Although the multi-functional oligomer is not particularly limited if the predetermined mechanical properties and the chemical characteristic of the decoration layer can be obtained, but it may be preferably hexa-functional oligomer in consideration of the balance between the appropriate photo-polymerization reaction (reaction velocity) on the optical irradiation and the applicability of the ultraviolet ray hardening resin composite resulting from the viscosity of the oligomer. The concrete ingredient of the hexa-functional oligomer may be conventional ingredients such as dipentaerythritol, hexa-acrylate and sorbitol hexa-acrylate. The hexa-functional oligomer and other multi-functional oligomer more than tri-functional may be used together. The bi-functional oligomer is not especially limited if the predetermined adhesion is obtained, it may be acrylic acrylate of straight chain in case that light resistance adhesion should be improved and it may be EBECRYL 767 commercially available from Daicel Cytec., Inc. The bi-functional oligomer may be further used which can imparts other functions in addition to the adhesion.

Blend Rate of Multi-Functional Oligomer and Bi-Functional Oligomer

The multi-functional oligomer and the bi-functional oligomer may have a blend rate set according to the balance of the mechanical properties and the adhesion of the decoration layer hardened by the ultraviolet ray and concretely it is preferred that the blend rate of the multi-functional oligomer may be 12 to 40 weight % among the blend rate of 25 to 56 weight % of the photo-polymerization oligomer while the blend rate of the bi-functional oligomer may be 7 to 16 weight %. If the blend rate of the multi-functional oligomer is less than 12 weight %, then the adhesion of the decoration layer will be improved, but the physical strength of the membrane will be sometimes insufficient and if it exceeds 40 weight %, then the physical strength of the membrane will be improved, but the adhesion will be undesirably reduced. If the blend rate of the bi-functional oligomer is less than 7 weight %, then the physical strength of the membrane will be high, but the adhesion will be sometimes insufficient and it exceeds 16 weight %, then the adhesion will be improved, but the physical strength of the membrane will be undesirably insufficient.

Photo-Polymerization Monomer "Part 1"

The bi-functional monomer of the photo-polymerization monomer functions to dilute the photo-polymerization oligomer and also has the solubility for dissolving the dried and solidified print pattern (ink) to thereby impart the adhesion to the print pattern and the bi-functional monomer itself has hardening reaction when hardened by the ultraviolet ray to thereby impart the hardenability to the decoration layer itself.

Photo-Polymerization Monomer "Part 1"=Concrete Ingredient of Bi-Functional Monomer Referring to concrete example of the bi-functional monomer, there may be listed conventional ingredients such as dipropylene glycol diacrylate, 1.6-hexanediol diacrylate, tripropylene glycol diacrylate, PEG600 diacrylate, PO denaturaten neopentyl glycol diacrylate, denaturaten bis-phenol A diacrylate, ethoxylated bisphenol A diacrylate, tricyclodecane dimethanol diacrylate, PEG400 diacrylate, tetraethylene glycol diacrylate, triethylene glycol diacrylate, and polyethylene glycol diacrylate and they may be used independently or combining more than one of them. In the invention, there may be preferably used 1.6 hexanediol diacrylate, cyclohexyl acrylate and dipropylene glycol diacrylate as the bi-functional monomer and as the permeability into and the solvent power to the ink and further the suitable SP value are taken into consideration, 1.6 hexanediol diacrylate and dipropylene glycol diacrylate may be preferably used.

Photo-Polymerization Monomer "Part 2"=Addition of Multi-Functional Monomer

As already stated, a part of the bi-functional monomer may be replaced by the multi-functional monomer whereby the function originating from the multi-functional monomer can be added and the strength of the decoration layer can be further improved especially if the replaced multi-functional monomer is a tetra-functional monomer. The concrete ingredients of the tetra-functional monomer which may be used are penta-erythritol tetraacrylate, penta-erythritol ethoxy tetraacrylate, ditrimethylol propane tetraacrylate, etc., but if the effect of the invention is accomplished, conventional ingredients may be used. The blend rate of the tetra-functional monomer may be 10 or less weight % among 33 to 65 weight % of the blend rate of the photo-polymerization monomer (bi-functional monomer). If the tetra-functional monomer exceeds 10 weight %, then the blend rate of the bi-functional monomer will be excessively reduced whereby the ink solubility by the bi-functional monomer decreases and therefore the adhesion thereof will decrease and furthermore, a good balance with the membrane characteristic resulting from the photo-polymerization oligomer and the tetra-functional monomer cannot be undesirably obtained.

Blend Rates of Photo-Polymerization Oligomer and Photo-Polymerization Monomer

The reason why the blend rates of the photo-polymerization oligomer and the photo-polymerization monomer are 25 to 56 weight % and 33 to 65 weight %, respectively is that there are maintained the characteristic imparted by each above-mentioned ingredients with sufficient balance and all the desired characteristics cannot be obtained well if it falls out from the blend rate.

Leveling Agent

Although the viscosity and the ink solubility of the coating agent are mainly adjusted by the bi-functional monomer in the ultraviolet ray hardening resin composite, if the bi-functional monomer is contained much, the viscosity of the ultraviolet ray hardening resin composite will become lower and also the ink solvent power thereof will become higher. Thus, although the film adhesion thereof to the article after hardened is improved, the poor membrane strength and the poor contraction will be caused. Reversely, if the bi-functional monomer decreases, the viscosity of the ultraviolet ray hardening resin composite will get higher and also the ink solubility thereof will be lower whereby the membrane strength and the prevention of poor contraction can be maintained, but the adhesion will be reduced. Thus, the viscosity of the resin composite will be associated with the adhesion and the membrane strength thereof and further with the contraction thereof. Therefore, it is required that the viscosity of the resin composite is desirable and also that the balance of the adhesion, the membrane strength and the contraction may be maintained. Therefore, in case where it is difficult to obtain such a balance with only the bi-functional monomer, the good permeability of the resin composite into the ink and the coatability (applicability) thereof can be accomplished with sufficient balance while the adhesion, the membrane strength and the contractility thereof are optimized by adding a leveling agent of predetermined quantity thereto. The amount of addition of the leveling agent may be preferably 0.01 to 0.1 weight % relative to the whole weight of the ultraviolet ray hardening resin composite (photo-polymerization oligomer+photo-polymerization monomer+photo-polymerization initiator+non-reactive resin). If it is less than 0.01 weight %, then the ultraviolet ray hardening resin composite cannot have sufficient coatability even though the photo-polymerization monomer has the optimum blend range and therefore there will occur the defect of being unable to accomplish uniform activation of the print pattern. If it exceeds 1 weight %, then the fluidity of the ultraviolet ray hardening resin composite becomes high too much and therefore the unhardened activated coated film (print pattern) flows whereby contraction wrinkles occur on the edge thereof and the defect of poor shrinkage occurs. Such a leveling agent may be preferably silicone based material.

Photo-Polymerization Initiator "Part 1"

The photo-polymerization initiator serves to initiate the photo-polymerization reaction of the photo-polymerization oligomer and the photo-polymerization monomer. The reason why the blend rate of the initiator is 5 to 10 weight % is that if it is less than 5 weight %, the photo-polymerization reaction can never proceed sufficiently whereby the default such as poor hardening occurs and if it exceeds 10 weight %, then in case where the decoration layer after hardened is exposed to ultraviolet ray, a free radical will be easily produced within the decoration layer so that the contraction of the decoration layer will become remarkable with the result that the light-resistance adhesion will be reduced.

Photo-Polymerization Initiator "Part 2"=Combined Use of Internal Hardening Type Photo-Polymerization Initiator and Surface Hardening Type Photo-Polymerization Initiator In the invention, in order that the ultraviolet ray hardening resin composite dissolves the dried and solidified ink and permeates the ink, the photo-polymerization initiator may preferably include both of the surface hardening type photo-polymerization initiator and the internal hardening type photo-polymerization initiator. The internal hardening type photo-polymerization initiator is suitably used when the print pattern contains black ink. The blend rate of the internal hardening type photo-polymerization initiator when both photo-polymerization initiators are included may be desirably 10 to 90 weight % of the whole photo-polymerization initiator. The surface hardening type photo-polymerization initiator can preferentially shrink only the surface of the decoration layer whereby the fine unevenness is formed on the surface of the decoration layer to impart a matting effect thereto. The surface hardening type photo-polymerization initiator which may be used is a hydroxy ketone system, for example and the internal hardening type photo-polymerization initiator which may be used is an acyl-phosphine oxide, for example.

Non-Reactive Resin

The non-reactive resin used for the invention has such a function as the strength and the chemical resistance of the decoration layer are compatible with each other and therefore, the ultraviolet ray hardening resin composite application into the print pattern simultaneously improves the strength, the chemical resistance and the adhesion of the decoration layer. Namely, as the non-reactive resin is added, the nonreactive resin is distributed in the sea island state within the print pattern and therefore the hardening shrinkage of the decoration layer is moderated to thereby improve the adhesion of the hardened coating film of the decoration layer to the surface of the article. Furthermore, when it is placed under the ultraviolet ray exposure environment or exposed under the heating environment after hardened, the hardening shrinkage of the decoration layer induced by the free radical produced within the hardened coating film of the decoration layer is moderated to thereby also improve the light resistance adhesion. If the non-reactive resin is not added, then when it is especially tried to heighten the strength of the decoration layer imparted by the photo-polymerization monomer, it is difficult to reduce the adhesion of the decoration layer imparted by the photo-polymerization oligomer and as a result to maintain both of the characteristics. The blend rate of the non-reactive resin is 2 to 10 weight % because if it is less than 2 weight %, the aforementioned shrinkage moderation effect cannot be obtained and therefore the adhesion and the light resistance adhesion caused by the addition of the non-reactive resin will be reduced and if it exceeds 10 weight %, then the chemical resistance performance would be reduced. The non-reactive resin used is not particularly limited as long as the aforementioned effect can be embodied, but it may be preferably acrylics polymer. The molecular weight (weight average molecular weight by gel permeation chromatography measurement) of the acrylics polymer may be preferably 50000-10000 and it may be especially desirably 60000-80000.

Addition of Solvent

In case where the non-reactive resin such as the acrylics polymer used for the invention is in the state of high viscosity or in the mode of half-solid or solid it may be preferably added in the state where it is melted by solvent in order to distribute the ultraviolet ray hardening resin composite in a uniform manner. The solvent may be removed after acrylics polymer is distributed into the ultraviolet ray hardening resin composite in the uniform manner or it may be used for the coating agent while it may be left in the ultraviolet ray hardening resin composite. In the latter case, the ink activation is performed by the photo-polymerization monomer (bi-functional monomer) of the ultraviolet ray hardening resin composite. The solvent is added for the purpose of the dissolution of the non-reactive resin (acrylics polymer) and the uniform distribution of the non-reactive resin into the ultraviolet ray hardening resin composite and therefore, it should be understand that the solvent should be used in the characteristic (solvent power) which never prevents the activation of the print pattern by the photo-polymerization monomer of the ultraviolet ray hardening resin composite and the amount of addition thereof. The fundamental difference between the solvent type activating agent and the non-solvent type activation ingredient of the ultraviolet ray hardening resin composite is that according to the former activating agent, since the solvent ingredient volatilizes after its application, the plastic state by the adhesive reappearance of ink changes as time elapses while according to the latter activating agent (of the invention), since the adhesion of the ink is reproduced by the photo-polymerization monomer ingredient which never volatilizes, the plastic state of the ink never changes. Such an effect is never remarkably damaged even though the solvent of the specified amount is blended together with the blend rate of the photo-polymerization monomer of the invention maintained. The amount of addition of the solvent for such a purpose may be 5 weight %-50 weight % relative to the whole ultraviolet ray hardening resin composite (photo-polymerization oligomer+photo-polymerization monomer+photo-polymerization initiator+non-reactive resin).

Light Resistance Imparting Agent

In order to improve the light resistance while the adhesion of the decoration layer on the surface of the article obtained by applying the ultraviolet ray hardening resin composite coating agent of the invention to the transfer film, transferring it under water pressure and hardening it, a light resistance imparting agent such as like UV-A or HALS may be added at a predetermined blend rate. The amount of addition of UV-A is preferably within the range of 0.5 to 1.5 weight % relative to the whole ultraviolet ray hardening resin composite (photo-polymerization oligomer+photo-polymerization monomer+photo-polymerization initiator+non-reactive resin). The reason is that if it is less than 0.5 weight %, then it never contributes to improvement of the light resistance adhesion and if it exceeds 1.5 weight %, then it causes the reduction of the adhesion. The amount of addition of HALS is preferably within the range of 1.5 to 3.5 weight %. The reason is that if it is less than 1.5 weight %, then it never contributes to improvement of the light resistance adhesion and if it exceeds 3.5 weight %, then it causes the reduction of the adhesion and the light resistance adhesion. The UV-A or HALS used may be conventionally available one. The weight % of the amount of addition of these ingredients is outside the range of 100 weight % of the ultraviolet ray hardening resin composite.

Matting Agent

Resin beads may be added to the ultraviolet ray hardening resin composite so that such design expression as grows hazy onto the whole decoration layer can be obtained. If they are glass beads, they will sink by the big specific gravity, they may be preferably the beads of PET resin, acrylic resin, or urethane resin. In case where the matting agent is added, the viscosity of the coating agent may be 1000 CPS (25° C.) or less from the viewpoint of the coatability. In consideration of the matting effect and the proper viscosity, the amount of addition of the matting agent may be preferably 5 to 20 weight % relative to the whole ultraviolet ray hardening resin composite (photo-polymerization oligomer+photo-polymerization monomer+photo-polymerization initiator+non-reactive resin). If it is less than 5 weight %, then sufficient matting effect will not be able to be obtained, but if it exceeds 20 weight %, then the viscosity of the coating agent will be higher, which causes the coating operation to be undesirably difficult.

Storage Form=Two Liquefaction

In the coating agent of the invention, the non-reactive resin sometimes induces the thermal polymerization of the ultraviolet ray hardening resin composite when the temperature becomes high and especially, this will be more remarkable if the matting agent such as resin beads is used together. Therefore, in case where the coating agent is used with high temperature storage, such a phenomenon can be avoided by storing the coating agent in the state where the photo-polymerization ingredient (photo-polymerization oligomer and photo-polymerization monomer) and the non-reactive resin do not coexist. That is, there is stored “A” liquid of the composite which has the photo-polymerization ingredient as main ingredient, but is not blended with the non-reactive resin and “B” liquid of the composite which has the non-reaction resin as main ingredient, but is not blended with the photo-polymerization ingredient and when the coating agent is to be used, “A” and “B” liquids are preferably mixed with each other. Although the photo-polymerization initiator and the additive (light resistance imparting agent, leveling agent and/or matting agent) may be blended with either "A" liquid or "B" liquid, especially preferably, "A" liquid may be the composite which does not contain only non-reactive resin and "B" liquid may be non-reactive resin because a variation of blend of the composite ingredient in the mixture of "A" and "B" liquids can be reduced and the characteristic of the activating agent according to the blend rate of "A" and "B" liquids can be adjusted easily.

In order to maintain the uniform distribution into "A" liquid of the non-reactive resin, "B" liquid may be preferably stored in the state where it is dissolved in the minimum solvent necessary for distributing the non-reactive resin in a uniform manner, but the non-reactive resin may be stored in the state where it is not dissolved in the solvent and may be dissolved in the solvent when they are mixed. By using the form of such separate liquids, the problem of the invention can be solved and the quality stability for a long period of time is also accomplished to thereby obtain the product of high quality.

Viscosity of Coating Agent

The ultraviolet ray hardening resin composite 62 used for the invention preferably has the viscosity of 10-500 CPS (25° C.). If the viscosity (25° C.) is less than 10 CPS, there will be too high rate of the photo-polymerization monomer so that sufficient membrane physical properties cannot be obtained and therefore, even if the decoration layer having the ultraviolet ray hardening resin composite integrally combined, a good result is not obtained in a subsequent wiping test by solvents such as xylene. On the contrary, if the viscosity exceeds 500 CPS, there will be too low rate of the photo-polymerization monomer and therefore, it will not fully permeate the whole dry ink of the print pattern 40 and the adhesion of the ink will not reappear well. Although the viscosity of the coating agent of the invention is higher than that of the coating agent which the applicant previously disclosed in Patent Document 4, the ink solubility is not prevented by increasing the amount of application and adding some solvent.

Definition of CPS

As described in Patent Documents 4, what is meant by "CPS" in the viscosity of the ultraviolet ray hardening resin composite is the abbreviation of "centipoise" and the numerical value of this specification indicates the result of measurement by using the B-type-viscosity meter (Form BM) by Tokyo Keiki Co., Ltd.

Viscosity and Ink Solubility of Photo-Polymerization Monomer

As the photo-polymerization monomer has the viscosity of 3-30 CPS (25° C.) and the ink solubility of 9 or more at the SP value, the ultraviolet ray hardening resin composite having the viscosity of 10-500 CPS (25° C.) and the ink solubility of 7 or more at SP value can be more easily prepared.

SP Value of Ultraviolet Ray Hardening Resin Composite

The ultraviolet ray hardening resin composite 62 is required to have the ink solubility of the SP value of 7 or more and the reason thereof is as the same as that described in Patent Documents 4. That is, as the solubility of the ultraviolet ray hardening resin composite itself has the SP value of 7 or more, it is supposed to be closer to the solubility of the ink composite of the print pattern and therefore, sufficient ink solvent power can be provided. If the ink solubility has the SP value of less than 7, even if it permeates the dry ink of the print pattern 40 to be able to restore the adhesion of the ink, the print pattern 40 i.e., the decoration layer 44 becomes difficult to adhere to the surface of the article 10 after water pressure transfer.

The reason why the preferred range of SP value of the activating agent of the invention has the lowest limit of 7 lower than the lower limit of 10 of the SP value of the conventional activating agent (Patent Document 4) is based on the knowledge under the process where the activating agent of the invention is invented that even if the SP value ranges from 7 to less than 10, the ink solubility to the degree of having no problem in practice can be obtained in accordance with the compatibility of the ink composite of the print pattern and the activating agent etc.

Definition of SP Value

Similarly, the above-mentioned "SP value" is the abbreviation of Solubility parameter, as described in Patent Document 4 and is based on the turbidimetric titraten method announced by K. W. Sue and D. H. Clarke, which is described in "Journal of Polymer Science Part A-1, Vol. 5, pages 1671-1681 (1967).

EXAMPLE

Examples 1 Through 14 and Comparisons 1 Through 5

Examples 1 through 14 will be explained while comparing with Comparisons 1 through 5 later. The concrete blend rates of each ingredient of these Examples and Comparisons are as shown in Tables 1 through 3. In these Tables, the blend rates are indicated by weight %.

TABLE 1

| Ingredient | | | Example 1 | Example 2 | Example 3 | Example 4 | Example 5 | Example 6 | Example 7 | Example 8 |
|---|---|---|---|---|---|---|---|---|---|---|
| Main ingredient | Photo-polymerization oligomer | hexa-functional | 29.5 | 29.5 | 30.0 | 27.5 | 18.0 | 40.0 | 26.4 | 29.0 |
| | | bi-functional | 10.7 | 10.7 | 10.9 | 10.0 | 7.0 | 16.0 | 9.6 | 10.5 |
| | Photo-polymerization monomer | bi-functional | 44.7 | 44.7 | 45.4 | 41.7 | 65.0 | 33.0 | 40.0 | 44.0 |
| | | tetra-functional | 4.5 | 4.5 | 4.6 | 4.2 | 0.0 | 0.0 | 4.0 | 4.5 |
| | Photo-polymerization initiator | | 7.0 | 7.0 | 7.1 | 6.6 | 7.0 | 7.0 | 10.0 | 10.0 |
| | Non-reactive resin | | 3.6 | 3.6 | 2.0 | 10.0 | 3.0 | 4.0 | 10.0 | 2.0 |

TABLE 1-continued

| | | Ingredient | Example 1 | Example 2 | Example 3 | Example 4 | Example 5 | Example 6 | Example 7 | Example 8 |
|---|---|---|---|---|---|---|---|---|---|---|
| Subsidiary ingredient | | Leveling agent | 0.03 | 0.03 | 0.03 | 0.03 | 0.03 | 0.03 | 0.03 | 0.03 |
| | | UV-A | 0.9 | 0.9 | 0.9 | 0.9 | 0.9 | 0.9 | 0.9 | 0.9 |
| | | HALS | 2.2 | 2.2 | 2.2 | 2.2 | 2.2 | 2.2 | 2.2 | 2.2 |
| | | Matting agent | — | 11.2 | — | — | — | — | — | — |
| | | Diluent (Solvent) | 8.9 | 22.4 | 4.9 | 24.7 | 8.9 | 9.8 | 24.7 | 4.9 |
| Evaluation result | Hardened article | Membrane mechanical strength | ◎ | ◎ | ◎ | ◎ | ○ | ◎ | ◎ | ◎ |
| | | Light resistance adhesion | ◎ | ◎ | ○ | ◎ | ◎ | ◎ | ○ | ○ |
| | | Chemical resistance | ◎ | ◎ | ○ | ○ | ○ | ○ | ○ | ○ |
| | | Activating agent storage | ○ | ○ | ○ | ○ | ○ | ○ | ○ | ○ |

TABLE 2

| | | Ingredient | Example 9 | Example 10 | Example 11 | Example 12 | Example 13 | Example 14 | Example 15 | Example 16 |
|---|---|---|---|---|---|---|---|---|---|---|
| Main ingredient | Photo-polymerization oligomer | hexa-functional | 30.7 | 28.0 | 29.5 | 29.5 | 12.0 | Two liquid of Example 1 | Two liquid of Example 2 | 29.5 |
| | | bi-functional | 11.1 | 10.2 | 10.7 | 10.7 | 13.0 | | | 10.7 |
| | Photo-polymerization monomer | bi-functional | 46.5 | 42.5 | 49.2 | 38.2 | 65.0 | | | 37.2 |
| | | tetra-functional | 4.7 | 4.3 | 0.0 | 11.0 | 0.0 | | | 12.0 |
| | Photo-polymerization initiator | | 5.0 | 5.0 | 7.0 | 7.0 | 7.0 | | | 7.0 |
| | Non-reactive resin | | 2.0 | 10.0 | 3.6 | 3.6 | 3.0 | | | 3.6 |
| Subsidiary ingredient | | Leveling agent | 0.03 | 0.03 | 0.03 | 0.03 | 0.03 | | | 0.03 |
| | | UV-A | 0.9 | 0.9 | 0.9 | 0.9 | 0.9 | | | 0.9 |
| | | HALS | 2.2 | 2.2 | 2.2 | 2.2 | 2.2 | | | 2.2 |
| | | Matting agent | — | — | — | — | — | | | — |
| | | Diluent (Solvent) | 4.9 | 24.7 | 8.9 | 8.9 | 8.9 | | | 50.0 |
| Evaluation result | Hardened article | Membrane mechanical strength | ◎ | ◎ | ○ | ◎ | ○ | ◎ | ◎ | ○ |
| | | Light resistance adhesion | ○ | ◎ | ◎ | ◎ | ◎ | ◎ | ◎ | ○ |
| | | Chemical resistance | ○ | ○ | ○ | ○ | ○ | ◎ | ◎ | ○ |
| | | Activating agent storage | ○ | ○ | ○ | ○ | ○ | ◎ | ◎ | ◎ |

TABLE 3

| | | Ingredient | Comparison 1 | Comparison 2 | Comparison 3 | Comparison 4 | Comparison 5 |
|---|---|---|---|---|---|---|---|
| Main ingredient | Photo-polymerization oligomer | hexa-functional | 30.6 | 26.1 | 35.5 | 10.0 | 15.0 |
| | | bi-functional | 11.1 | 9.4 | 0 | 13.7 | 5.0 |
| | Photo-polymerization monomer | bi-functional | 46.4 | 39.5 | 39.5 | 53.0 | 60.0 |
| | | tetra-functional | 4.6 | 3.9 | 3.9 | 5.2 | 3.9 |
| | Photo-polymerization initiator | | 7.3 | 6.1 | 6.1 | 8.1 | 6.1 |
| | Non-reactive resin | | 0 | 15 | 15 | 10 | 10 |
| Subsidiary ingredient | | Leveling agent | 0.03 | 0.03 | 0.03 | 0.03 | 0.03 |
| | | UV-A | 0.9 | 0.9 | 0.9 | 0.9 | 0.9 |
| | | HALS | 2.2 | 2.2 | 2.2 | 2.2 | 2.2 |
| | | Matting agent | — | — | — | — | — |
| | | Diluent (Solvent) | 0 | 36.0 | 36.0 | 8.9 | 36.0 |
| Evaluation result | Hardened article | Membrane mechanical strength | ◎ | ○ | ◎ | X | ○ |
| | | Light resistance adhesion | X | ○ | X | ○ | X |
| | | Chemical resistance | X | X | X | X | X |
| | | Activating agent storage | ◎ | X | X | ○ | ○ |

In these Tables, the hexa-functional oligomer used was UH-3320HA manufactured by Negami Chemical Industrial Co., Ltd., the bi-functional oligomer used was EBECRYL676 manufactured by Daicel Cytec., Inc. the bi-functional monomer used was 1.6-hexanediol diacrylate and the tetra-functional monomer used was di-trimethylol-propane-tetra-acrylate. The non-reactive resin used was acrylics polymer ("UBIC" polymer manufactured by Ohashi Chemical Industries Ltd. (solvent distribution type one having solid content of 40%) having the weight average molecular weight of 75000 and the solvent for dilution used was butyl carbitol acetate. The blend amount of the non-reactive resin in Tables 1 through 3 was a solid content equivalent value and the amount of addition of the solvent was the value containing the solvent in said "UBIC" polymer. The photo-polymerization initiator used was a mixture of hydroxy ketones (surface hardening type) and acyl phosphine oxides (internal hardening type), which were combined at a rate of 1 to 1 and the leveling agent used was a leveling agent for UV coating having the frame of commercially available di-methyl-poly-siloxane (BYK-UV3500 ("BYK" is a registered trademark) manufactured by BYK Chmie Japan Co., Ltd.). The UV-A used was hydroxyl-phenyl triazine (HPT) UV absorbent and the light stabilizer agent used was hindered amine (HALS).

In these Examples and Comparisons, a pattern-transferred article was a board of ARS resin having the size of 10 cm×20 cm×3 mm (TM 20 manufactured by UMG ABS, Inc.). The decoration layer of predetermined pattern was formed on the pattern-transferred article by the water pressure transfer method shown in FIG. 2 using the coating agent comprising the corresponding ultraviolet ray hardening resin composite. In this case, the print pattern of the transfer film had the thickness of 3 micrometers and the coating agent of the invention was applied having the thickness of 10 micrometers by the wire bar coating method.

Valuation Method for Every Evaluation Item

The valuation method will be described later for each evaluation item in the evaluation result of Tables 1 through 3. In the valuation method, "◎ (double circle)" indicates "superior", "○ (single circle)" indicates "good" and both of them are desirable results for Example. Meantime, "X" indicates "impossible" and undesirable results in Example.

Membrane Mechanical Strength

"Membranous mechanical strength" was evaluated by measuring the strength of the film (decoration layer) of the article to be tested by the pencil hardness test (JIS K5600-5-4 conformity) and "more than H" is judged as "◎", "HB-F" is judged as "○" and "Not Reaching HB" is judged as "X."

Adhesion

The light resistance adhesion when exposed to ultraviolet ray was evaluated, which is the severe evaluation conditions of the adhesion. This evaluation was performed by exposing to the ultraviolet ray the pattern-transferred article (the article having the decoration layer) using the xenon fade meter (SX 75) manufactured by Suga Test Instruments Inc., a light resistance irradiation machine on the conditions of black panel temperature of 89° C., humidity of 50% and ultraviolet-rays radiation illumination of 100 W/m$^2$ (the wavelength range of 300-400 nm) and observing the state of removal of specimens having addition light volume changed for every specimen by the crossing cut examination (Old JIS K5400-8.5 conformity) to evaluate the light resistance adhesion. When ten specimens for every same addition light volume was tested, the addition light volume of over 125 MJ when at least one removal occurs was judged as "◎", that of "75-125 MJ" was judged as "○" and that of "less than 75 MJ" was judged as "X".

Chemical Resistance=Permeability and Barrier Property of Oleic Acid

Test liquid (using solvent of petroleum benzene) of 0.2 ml containing oleic acid having a content rate of 10% was extracted by a syringe, dropped on a concavo-convex design surface of the articles to be tested, after the articles to be tested were left in an oven of 80° C. for 4 hours and for 24 hours, respectively, they were taken out of the oven and cooled naturally to the room temperature and the oil of the surface of the articles to be tested was wiped off. Then, the film (the decoration layer) of the article was torn off by the Sellotape (registered trademark, manufactured by Nichiban, Japan) and the adhesion was evaluated. In this evaluation, the case where there was observed no change in appearance (swelling etc.) or no removal of the film was judged as "◎", the case where there was no removal of the film although there was a change in appearance (where there was no problem as a product) was judged as "○" and the case where there were both of change in appearance and removal of the film (where there could not be used as a product) was judged as "X".

Evaluation of Storage of Coating Agent

After the coating agent (the activating agent) contained in an airtight container was left and stored therein at a temperature of 50° C. (degree Celsius) for 6 weeks, it was taken out from the container and coated on the transfer film. The case where the coatability was good was judged as "◎", the case where the coating is possible in spite of an increase in viscosity was judged as "○" and the case where the coating is impossible due to remarkable increase in viscosity was judged as "X".

Evaluation Result (1) Seeing Table 1, it will be noted that the article according to Example 1 among Examples of the invention is excellent in all of membrane mechanical strength, light resistance adhesion and chemical resistance and all the characteristics have been realized with sufficient balance.

(2) On the other hand, seeing Table 3, it will be noted that the article according to Comparison 1 is incompatible in membrane mechanical strength and light resistance adhesion because the coating agent has no non-reactive resin used and the articles according to comparisons 2 and 3 had the poor chemical resistance of the decoration layer because the non-reactive resin of the coating agent exceeded the predetermined range of the invention (see claim 1).

(3) Referring to Table 1 through 3, although all the characteristics of Examples 1-16 were not excellent, they had no practical trouble. Since Comparison 3 through 5 had the blend rate of the photo-polymerization oligomer and the photo-polymerization monomer and the blend rate of either hexa-functional oligomer or bi-functional oligomer which constitutes the photo-polymerization oligomer deviated from the predetermined range of the invention (see claims 1 and 2), at least one characteristic of the three characteristics is improper and they could not be practically used, which will shows the basis of the blend rate of each ingredient of the invention.

(4) It will be noted from the results of Examples 1 and 12 and that of Example 11 having the same blend rate of the multi-functional oligomer as Examples 1 and 12, but having the blend rate of the photo-polymerization monomer different those of Examples 1 and 12 that the membrane mechanical strength could be further improved by replacing a part of the photo-polymerization monomer by multi-functional monomer.

It will be noted from the results of Examples 12 and 16 that as the multi-functional monomer exceeds 10 weight %, the blend rate of the bi-functional monomer decreases and therefore the tendency to reduce the adhesion appeared under the influence of the reduction of the ink solubility by the bi-functional monomer. Thus, it will be noted that the blend rate of the multi-functional monomer is preferably 10 or less weight %.

Although the Examples showed only the case where the tetra-functional monomer was used as the multi-functional monomer, the molecular bond by photo-polymerization is formed in three dimensions even in case where penta-functional monomer or hexa-functional monomer are used and therefore, the membrane mechanical strength will be improved, similarly. Thus, these multi-functional monomer may be also included in the in the invention.

(5) Again referring to Table 1, it will be noted that the product according to Example 2 in which the matting agent was added to the coating agent had all the characteristics excellent in a manner similar to Example 1.

(6) Example 16 of Table 2 was the case where the solvent had 50 weight % considerably more than other Examples. If the amount of addition of the solvent exceeds 50 weight %, then the volatilization of the solvent will progress after applying the coating agent to the print pattern and the ink plasticization will be reduced as time elapses whereby there occurs the tendency that it will become difficult to control the expansion of the decoration layer on the water surface. Furthermore, after the transfer of the print pattern to the article and its hardening or in a crossing cut test for evaluation of light resistance adhesion, there sometimes occurs the case where the adhesion will be reduced or the characteristics other than the membrane mechanical strength is fragile for practical use. Thus, it was noted that the solvent is preferably 50 or less weight %.

(7) It will be noted that the storage of the coating agent (activating agent) was good in all Examples and Comparisons other than those 2 and 3 and especially as the coating agent was stored in two liquid mode where it was divided into the ingredients of the photo-polymerization ingredient and the non-reactive resin, the storage of the coating agent was good. It will be considered that Comparisons 2 and 3 had the bad storage of the coating agent because there were many amounts of addition of the non-reactive resin and therefore the inducement degree of the thermal polymerization of the ultraviolet ray hardening resin composite increased.

(8) Finally, although not shown in any of Tables, in all Examples and Comparisons, it has been noted that all had no faults such as line drawing and repellence when the coating agent was applied to the print pattern and had good coatability.

INDUSTRIAL APPLICABILITY

Since the ultraviolet ray hardening resin composite in the coating agent of the invention includes a multi-functional oligomer for imparting mechanical and chemical properties of a decoration layer formed by transferring a print pattern under water pressure, a bi-functional oligomer for imparting light resistance adhesion of the decoration layer, a multi-functional monomer for imparting strength of the decoration layer, a bi-functional monomer having a solubility for restoring the adhesion and a non-reactive resin such as acrylics polymer having the function to maintain both of the physical properties (strength and chemical resistance) and the adhesion of the decoration layer, which are inconsistent with each other, both of the excellent strength and chemical resistance of the decoration layer and the excellent adhesion including the light resistance adhesion can be improved simultaneously and therefore, the performance and the quality in practical use are heightened by application of the ultraviolet ray hardening resin composite to the print pattern, which causes the industrial availability to be improved.

The invention claimed is:

1. A coating agent for a water pressure transfer film, said coating agent comprising an ultraviolet ray hardening resin composite to be applied on a dried print pattern of said water pressure transfer film having said print pattern on a water-soluble film before said print pattern is transferred onto a surface of an article, said ultraviolet ray hardening resin composite including a photo-polymerization oligomer, a photo-polymerization monomer and a photo-polymerization initiator, said ultraviolet ray hardening resin composite serving to reproduce an adhesiveness of said print pattern by non-solvent activating ingredient of said ultraviolet ray hardening resin composite and permeating the whole of said print pattern to thereby be intermingled with said whole print pattern, wherein said photo-polymerization oligomer includes a multi-functional oligomer serving to impart mechanical and chemical properties of a decoration layer formed by transferring said print pattern under water pressure and a bi-functional oligomer serving to impart an adhesion to said decoration layer, said photo-polymerization monomer includes at least a bi-functional monomer serving to impart to said print pattern a solubility for recovering the adhesion of said print pattern, said coating agent includes a non-reactive resin added in addition to said ultraviolet ray hardening resin composite, said photo-polymerization oligomer including said multi-functional oligomer and said bi-functional oligomer is blended at 25 to 56 weight percent, said photo-polymerization monomer including at least said bi-functional monomer is blended at 33 to 65 weight percent, said photo-polymerization initiator is blended at 5 to 10 weight percent and said non-reactive resin is blended at 2 to 10 weight percent wherein all the blend rates are relative to a total weight of said photo-polymerization oligomer, said photo-polymerization monomer, said photo-polymerization initiator and said non-reactive resin and wherein said ultraviolet ray hardening resin composite has a viscosity of 10-500CPS (25° C.) and an ink solubility of SP value of 7 or more, and wherein said photo-polymerization oligomer is a compound of said multi-functional oligomer having a blend rate of 12 to 40 weight percent and said bi-functional oligomer has a blend rate of 7 to 16 weight percent.

2. A coating agent for a water pressure transfer film as set forth in claim 1 and wherein a part of said bi-functional monomer of said photo-polymerization monomer is partially replaced by a multi-functional monomer blended at 10 or less weight % while said blend rate of 25 to 56 weight % of said photo-polymerization monomer is maintained.

3. A coating agent for a water pressure transfer film as set forth in claim 1 and wherein said non-reactive resin is an acrylics polymer blended at a blend rate of 2 through 10 weight %.

4. A coating agent for a water pressure transfer film as set forth in claim 1 and wherein a light resistance imparting agent, a leveling agent and/or a matting agent are added to said coating agent.

5. A coating agent for a water pressure transfer film as set forth in claim 1 and wherein said coating agent is of two liquid type of "A" liquid including photo-polymerization ingredient (photo-polymerization oligomer and photo-polymerization monomer) and "B" liquid including non-reactive resin and the other ingredients are blended in either of liquids.

6. A coating agent for a water pressure transfer film as set forth in claim 2 and wherein said non-reactive resin is an acrylics polymer blended at a blend rate of 2 through 10 weight %.

7. A coating agent for a water pressure transfer film as set forth in claim 2 and wherein a light resistance imparting agent, a leveling agent and/or a matting agent are added to said coating agent.

8. A coating agent for a water pressure transfer film as set forth in claim 3 and wherein a light resistance imparting agent, a leveling agent and/or a matting agent are added to said coating agent.

* * * * *